(12) United States Patent
Hsu

(10) Patent No.: US 11,043,869 B2
(45) Date of Patent: Jun. 22, 2021

(54) MOTOR STATOR STRUCTURE AND STATOR ASSEMBLY

(71) Applicant: Chicony Power Technology Co., Ltd., New Taipei (TW)

(72) Inventor: Wei-Min Hsu, New Taipei (TW)

(73) Assignee: CHICONY POWER TECHNOLOGY CO., LTD., New Taipei (TW)

(*) Notice: Subject to any disclaimer, the term of this patent is extended or adjusted under 35 U.S.C. 154(b) by 303 days.

(21) Appl. No.: 16/150,958

(22) Filed: Oct. 3, 2018

(65) Prior Publication Data
US 2020/0052539 A1 Feb. 13, 2020

(30) Foreign Application Priority Data
Aug. 8, 2018 (TW) .................................. 107127700

(51) Int. Cl.
H02K 3/34 (2006.01)
H02K 15/12 (2006.01)
H02K 15/14 (2006.01)
H02K 1/14 (2006.01)
H02K 15/06 (2006.01)
H02K 5/08 (2006.01)

(52) U.S. Cl.
CPC ............. *H02K 3/345* (2013.01); *H02K 1/148* (2013.01); *H02K 5/08* (2013.01); *H02K 15/062* (2013.01); *H02K 15/12* (2013.01); *H02K 15/14* (2013.01)

(58) Field of Classification Search
CPC ........ H02K 3/345; H02K 15/14; H02K 1/148; H02K 15/062; H02K 5/08; H02K 15/12; H02K 3/522; H02K 3/325; H02K 15/10
See application file for complete search history.

(56) References Cited

U.S. PATENT DOCUMENTS

| 7,147,929 | B2 | 12/2006 | Amagi et al. | |
| 8,230,580 | B2 | 7/2012 | Kiyono et al. | |
| 8,610,328 | B2 * | 12/2013 | Yoshida | H02K 3/522 |
| | | | | 310/215 |
| 9,293,958 | B2 | 3/2016 | Ueno et al. | |
| 9,793,774 | B2 * | 10/2017 | Yokota | H02K 3/30 |
| 9,948,166 | B2 * | 4/2018 | Kino | H02K 3/522 |
| 10,063,118 | B2 * | 8/2018 | Yoshida | H02K 3/48 |

(Continued)

FOREIGN PATENT DOCUMENTS

| CN | 102801242 A | 11/2012 |
| CN | 104079097 A | 10/2014 |

(Continued)

*Primary Examiner* — Mohamad A Musleh
(74) *Attorney, Agent, or Firm* — Innovation Capital Law Group, LLP; Vic Lin

(57) ABSTRACT

A stator assembly includes a stator core, an insulated wire frame, a coil, and an annular insulation structure. The stator core includes a magnetic yoke portion and a radial tooth portion, and the radial tooth portion extends from the magnetic yoke portion. The insulated wire frame disposed outside the radial tooth portion of the stator core has a winding slot. The coil is wound in the winding slot of the insulated wire frame annularly. The annular insulation structure is formed by injection moulding and wraps an area where the coil is exposed out of the insulated wire frame, and the coil is packaged between the insulated wire frame and the annular insulation structure.

18 Claims, 11 Drawing Sheets

(56) References Cited

U.S. PATENT DOCUMENTS

| | | | | |
|---|---|---|---|---|
| 2007/0114878 A1* | 5/2007 | Tatebe | H02K 1/148 | 310/400 |
| 2009/0140595 A1* | 6/2009 | Naganawa | H02K 3/522 | 310/201 |
| 2009/0195112 A1* | 8/2009 | Chai | H02K 1/148 | 310/216.086 |
| 2010/0187918 A1* | 7/2010 | Takahashi | H02K 1/148 | 310/43 |
| 2010/0213784 A1* | 8/2010 | Iizuka | H02K 1/148 | 310/208 |
| 2010/0275436 A1* | 11/2010 | Kiyono | H02K 15/12 | 29/596 |
| 2011/0012445 A1* | 1/2011 | Nakanishi | H02K 15/12 | 310/43 |
| 2011/0025163 A1* | 2/2011 | Shiobara | H02K 3/522 | 310/198 |
| 2012/0286619 A1* | 11/2012 | Tsuiki | H02K 3/522 | 310/215 |
| 2013/0106238 A1 | 5/2013 | Saiki et al. | | |
| 2013/0113332 A1* | 5/2013 | Saito | H02K 3/48 | 310/214 |
| 2014/0015358 A1* | 1/2014 | Wan | H02K 15/02 | 310/71 |
| 2014/0035428 A1 | 2/2014 | Yuya et al. | | |
| 2015/0188372 A1* | 7/2015 | Yokota | H02K 3/34 | 310/43 |

FOREIGN PATENT DOCUMENTS

| | | | | |
|---|---|---|---|---|
| JP | 58201565 A | * | 11/1983 | H02K 3/345 |
| JP | 2016163444 A | | 9/2016 | |
| TW | 350162 B | | 1/1999 | |
| TW | M283428 U | | 12/2005 | |
| TW | M514696 U | | 12/2015 | |
| TW | 201631865 A | | 9/2016 | |
| WO | 2014115775 A1 | | 7/2014 | |

* cited by examiner

MOTOR STATOR STRUCTURE AND STATOR ASSEMBLY

CROSS-REFERENCE TO RELATED APPLICATION

This non-provisional application claims priority under 35 U.S.C. § 119(a) to Patent Application No. 107127700 filed in Taiwan, R.O.C. on Aug. 8, 2018, the entire contents of which are hereby incorporated by reference.

BACKGROUND

Technical Field

The instant disclosure relates to a motor component, and particularly to a motor stator structure and a stator assembly.

Related Art

Generally a main structure of an electric motor (also known as a motor) is formed by a stator structure and a rotor structure. The stator structure disposed inside the electric motor is stationary, and the rotor can rotate around a shaft and generate power through magnetic field interaction with the stator structure.

Most of the currently known stator structures are formed by winding a plurality of coils on a ring-shaped core, and are installed inside a motor frame. The space between the stator structure and the motor frame is filled with an insulating paste (varnish) by using a potting process or vacuum pressure impregnation treatment so as to insulate the stator structure from the external mechanism. However, the potting process or the vacuum pressure impregnation treatment requires additional step for the paste (varnish) to cure, which takes long time (at least 2 hours or more) in the process, thereby reducing the manufacturing efficiency.

SUMMARY

In view of this, a stator assembly provided in an embodiment includes a stator core, an insulated wire frame, a coil, and an annular insulation structure. The stator core includes a magnetic yoke portion and a radial tooth portion, and the radial tooth portion extends from the magnetic yoke portion. The insulated wire frame disposed outside the radial tooth portion of the stator core has a winding slot. The coil is wound in the winding slot of the insulated wire frame annularly. The annular insulation structure is formed by means of injection moulding and wraps an area where the coil is exposed out of the insulated wire frame, so that the coil is packaged between the insulated wire frame and the annular insulation structure.

A motor stator structure provided in one embodiment includes a plurality of stator assemblies, and the stator assemblies are connected together in a circle arrangement to form an annular structure.

As above, the stator assembly of the embodiment of the instant disclosure forms the annular insulation structure to wrap the coil by means of the injection moulding, so that the coil is quickly packaged between the insulated wire frame and the annular insulation structure to achieve insulation from the outside world. Compared with conventional manners of the potting process or the vacuum pressure impregnation treatment, the instant disclosure greatly saves time and cost. In addition, because the coil insulation process is completed on each stator assembly, the motor stator structure can be formed by connecting the stator assemblies into an annular structure, and the motor stator structure can be directly assembled in the motor outer frame without any further insulation process, thereby simplifying the motor manufacturing process and increasing the production yield.

BRIEF DESCRIPTION OF THE DRAWINGS

The disclosure will become more fully understood from the detailed description given herein below for illustration only, and thus are not limitative of the disclosure, and wherein.

DETAILED DESCRIPTION

Figure 1:
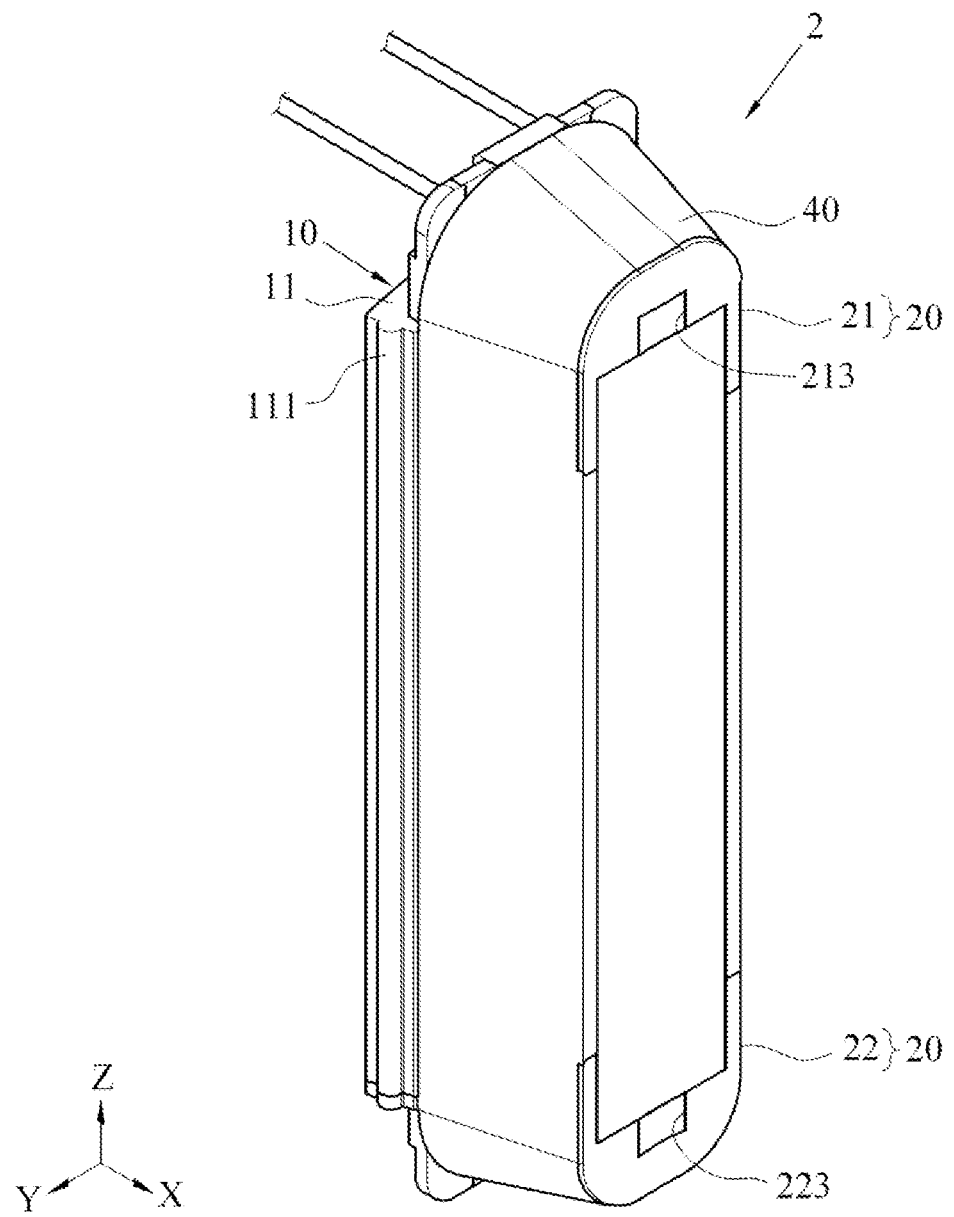
FIG. 1 is a three-dimensional view of a stator assembly according to an embodiment of the instant disclosure.

FIG. 1 to FIG. 5 are a three-dimensional view of a stator assembly, a three-dimensional view of a stator core, an assembly diagram of an insulated wire frame, a three-dimensional view of an insulated wire frame, and a schematic diagram illustrating winding of a coil according to an embodiment of a stator assembly of the instant disclosure respectively. As shown in FIG. 1 to FIG. 5, a stator assembly 2 includes a stator core 10, an insulated wire frame 20, a coil 30, and an annular insulation structure 40. The insulated wire frame 20 is disposed outside the stator core 10, and the coil 30 is wound on the insulated wire frame 20. The annular insulation structure 40 is formed by means of injection moulding, and wraps an area where the coil 30 is exposed out of the insulated wire frame 20, so that the coil 30 is packaged between the insulated wire frame 20 and the annular insulation structure 40 to achieve insulation from the outside world. The following is a detailed description of a structure and a manufacturing process of the stator assembly 2 with reference to the drawings.

Figure 2:
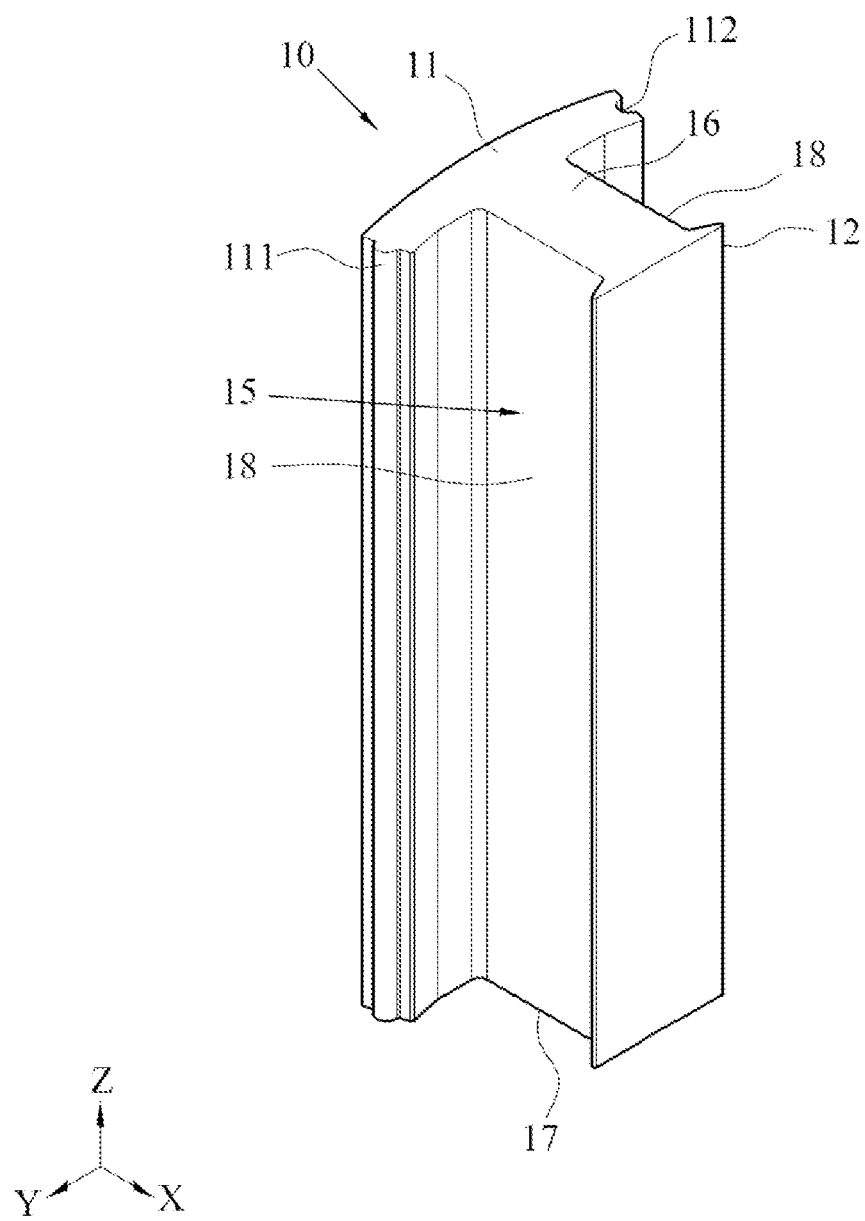
FIG. 2 is a three-dimensional view of a stator core according to an embodiment of a stator assembly of the instant disclosure.

As shown in FIG. 2, the stator core 10 is first provided. The stator core 10 is a strip module integrally manufactured (for example, by means of injection moulding or cast molding). For example, in this embodiment, the stator core 10 is a strip module extending in the Z-axis direction. Herein, the stator core 10 is integrally formed, is made of a soft magnetic material such as iron, cobalt, nickel or silicon steel, and has magnetic conductivity, which, however, is not limited in the instant disclosure. In other embodiments, the stator core 10 may also be formed by stacking a plurality of soft magnetic sheets (for example, iron, cobalt, nickel, or silicon steel sheets), and for example, a plurality of soft magnetic sheets can be bonded by using an adhesive or riveted together to form the strip module.

As shown in FIG. 2, in this embodiment, the stator core 10 includes a magnetic yoke portion 11 and a radial tooth portion 15. A cross section of the magnetic yoke portion 11 is strip-shaped, and the radial tooth portion 15 extends from an intermediate portion of the magnetic yoke portion 11. An end of the radial tooth portion 15 may have a boot portion 12 that protrudes in the Y-axis direction, such that the stator core 10 as a whole forms a T-shaped cross section. In other embodiments, the cross section of the stator core 10 may also be in other shapes. For example, the radial tooth portion 15 may extend from one end of the magnetic yoke portion 11, such that the stator core 10 as a whole forms a L-shaped cross section, or the stator core 10 may also be designed to other shapes according to actual needs, which is not limited in this embodiment.

Figure 3:
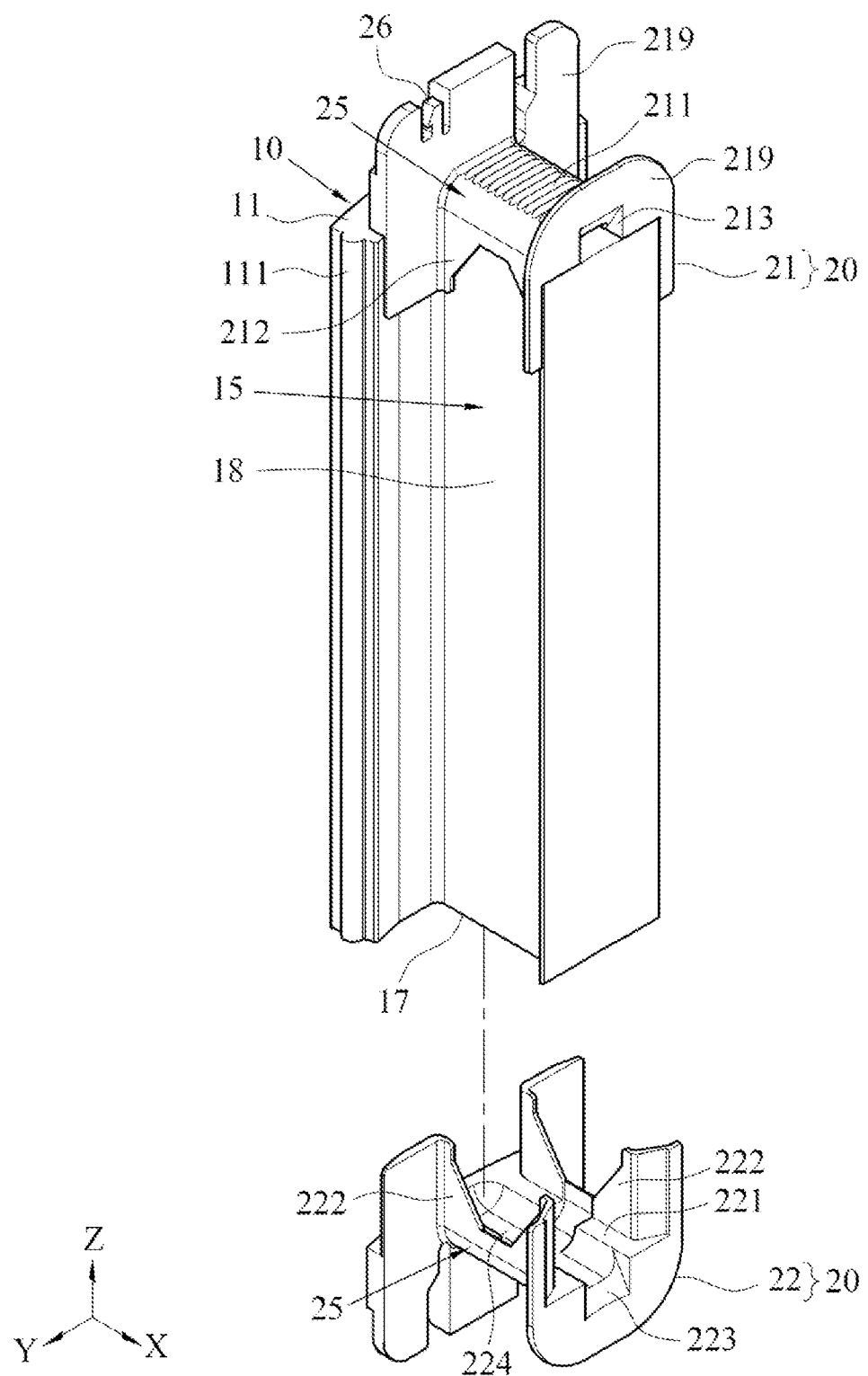
FIG. 3 is an assembly diagram of an insulated wire frame according to an embodiment of a stator assembly of the instant disclosure.

Next, as shown in FIG. 2 and FIG. 3, the insulated wire frame 20 is disposed outside the stator core 10. In this embodiment, the insulated wire frame 20 includes a first U-shaped frame 21 sleeved on a first end 16 of the radial tooth portion 15 and a second U-shaped frame 22 sleeved on a second end 17 of the radial tooth portion 15. In some embodiments, the first U-shaped frame 21 and the second U-shaped frame 22 may be made of insulating materials, and for example, the first U-shaped frame 21 and the second U-shaped frame 22 are made of plastic by means of injection moulding, and have an insulation effect.

As shown in FIG. 2 and FIG. 3, the radial tooth portion 15 of the stator core 10 includes two opposite sidewalls 18, and the first U-shaped frame 21 includes a first horizontal plate 211 and two first side plates 212 connected to two sides of the first horizontal plate 211. After the first U-shaped frame 21 is sleeved on the first end 16 of the radial tooth portion 15, the first horizontal plate 211 abuts against the first end 16 of the radial tooth portion 15, and the two first side plates 212 abut against the two sidewalls 18. The structure of the second U-shaped frame 22 may be the same as or similar to that of the first U-shaped frame 21, and in this case, the second U-shaped frame 22 includes a second horizontal plate 221 and two second side plates 222 connected to two sides of the second horizontal plate 221. After the second U-shaped frame 22 is sleeved on the second end 17 of the radial tooth portion 15, the second horizontal plate 221 abuts against the second end 17 of the radial tooth portion 15, and the two second side plates 222 abut against the two sidewalls 18. Herein, as the first U-shaped frame 21 and the second U-shaped frame 22 have the same or similar structure and are sleeved on opposite ends of the radial tooth portion 15, the insulated wire frame 20 can be applied to the stator core 10 of different lengths.

Figure 4:
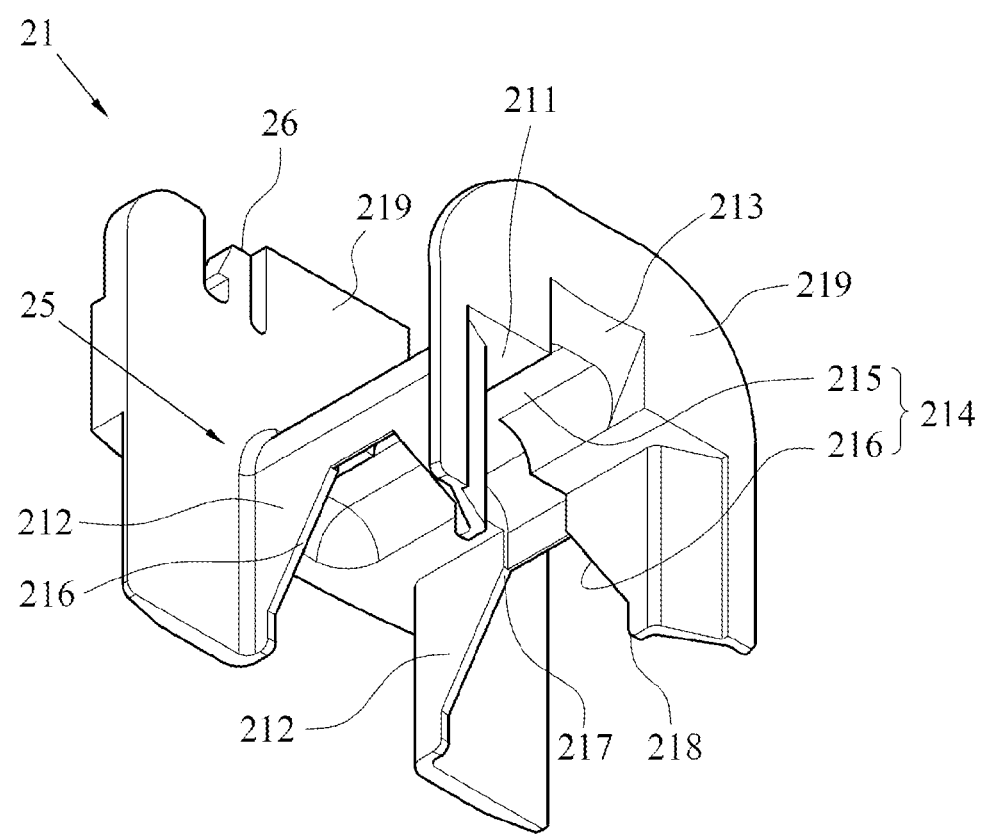
FIG. 4 is a three-dimensional view of an insulated wire frame according to an embodiment of a stator assembly of the instant disclosure.

As shown in FIG. 3 and FIG. 4, in this embodiment, the first U-shaped frame 21 has two partition plates 219. The first horizontal plate 211 and the two first side plates 212 are connected between the two partition plates 219, so that the winding slot 25 can be formed between the first horizontal plate 211, the two first side plates 212, and the two partition plates 219. The structure of the second U-shaped frame 22 may be the same as or similar to that of the first U-shaped frame 21, and in this case, the winding slot 25 can also be formed, which is not further described herein.

Figure 5:
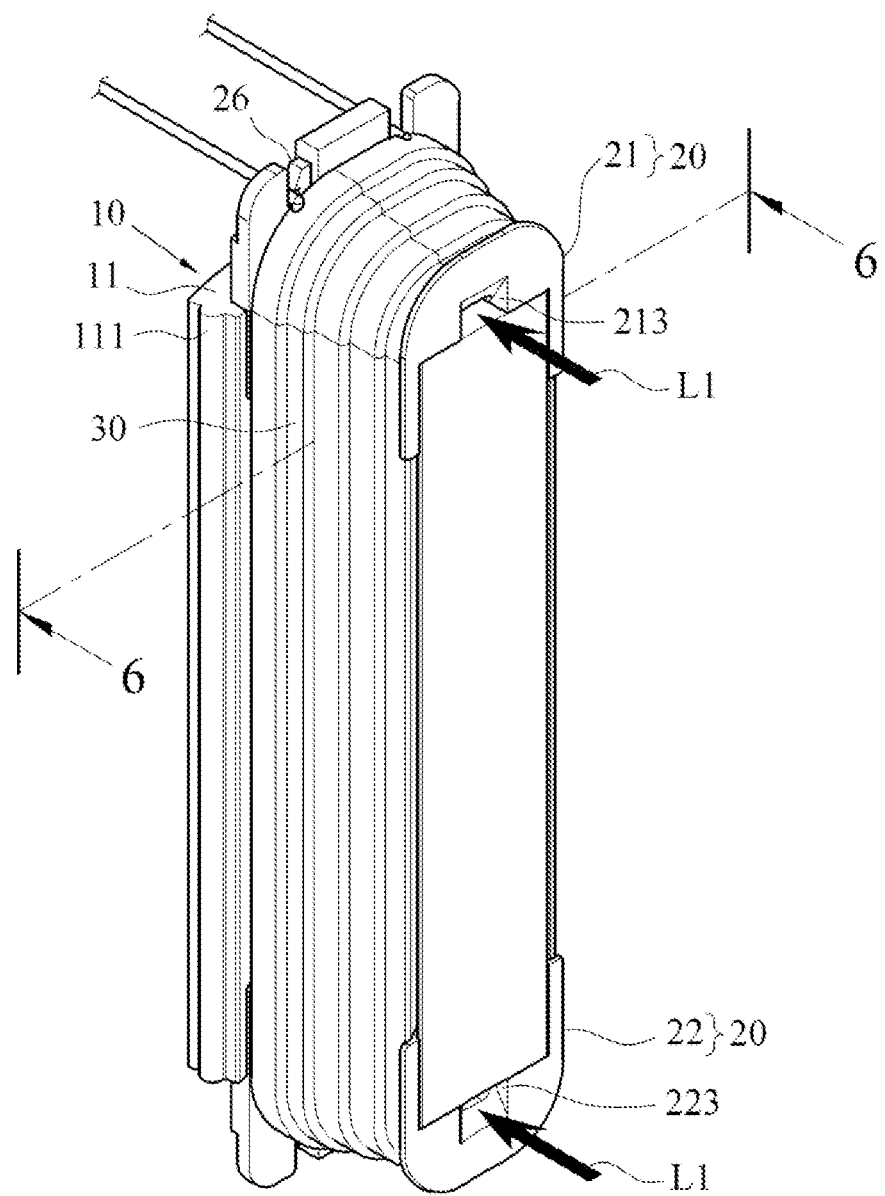
FIG. 5 is a schematic diagram illustrating winding of a coil according to an embodiment of a stator assembly of the instant disclosure.

Referring to FIG. 3 and FIG. 5, after the first U-shaped frame 21 and the second U-shaped frame 22 are separately sleeved on the two opposite ends of the radial tooth portion 15, the coil 30 is then wound in the winding slot 25 of the insulated wire frame 20 annularly, to prevent direct contact between the coil 30 and the stator core 10 to achieve insulation. In an embodiment, the insulated wire frame 20 may have a winding fixing portion 26 for fixing the coil 30. For example, in the embodiment of FIG. 5, the winding fixing portion 26 is a barb portion and is disposed on the partition plate 219 of the first U-shaped frame 21, and during the winding process of the coil 30, one end of the coil 30 can be hooked and fixed to the winding fixing portion 26 first, in order to facilitate winding the coil 30 in the winding slot 25 of the insulated wire frame 20 conveniently. In other embodiments, the winding fixing portion 26 may also be other fixing structures (such as grooves or holes), which is not limited in this embodiment.

Figure 6:
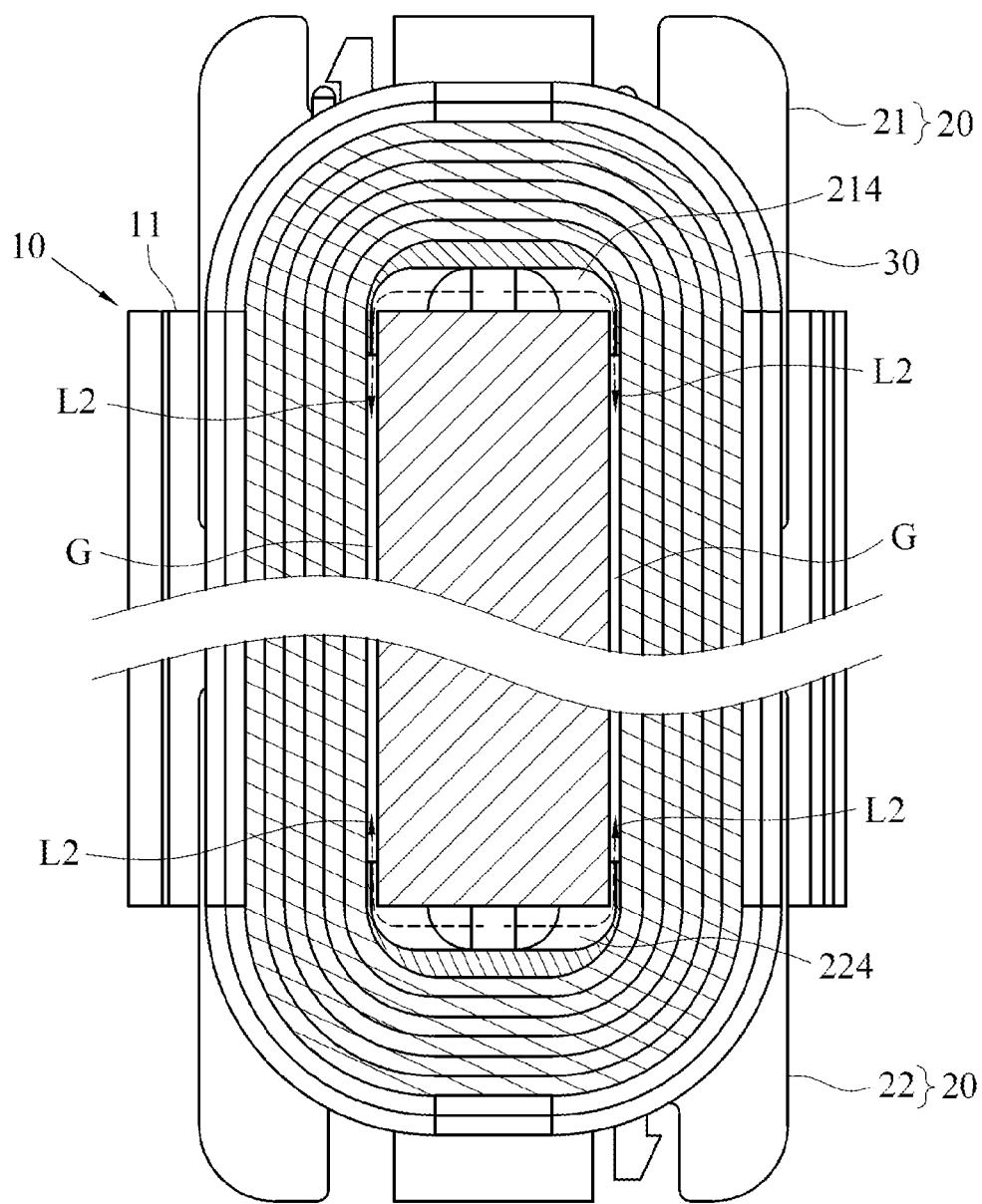
FIG. 6 is a cross-sectional view of a stator assembly along 6-6 in FIG. 5.

Referring to FIG. 5 and FIG. 6, where FIG. 6 is a cross-sectional view of a stator assembly along 6-6 in FIG. 5, the first U-shaped frame 21 and the second U-shaped frame 22 are only sleeved on the two opposite ends of the radial tooth portion 15. Therefore, two gaps G are formed between the first U-shaped frame 21, the second U-shaped frame 22, the coil 30, and the radial tooth portion 15 of the stator core 10 after the coil 30 is wound in the winding slot 25 of the insulated wire frame 20 annularly. Therefore, after the coil 30 is wound in the winding slot 25 of the insulated wire frame 20 annularly, the annular insulation structure 40 is formed by means of injection moulding to correspondingly wrap the area where the coil 30 is exposed out of the insulated wire frame 20 (for example, the periphery of the coil 30 and the two gaps G), so that the coil 30 is packaged between the insulated wire frame 20 and the annular insulation structure 40 to achieve insulation from the outside world, as described in detail below.

Figure 8:
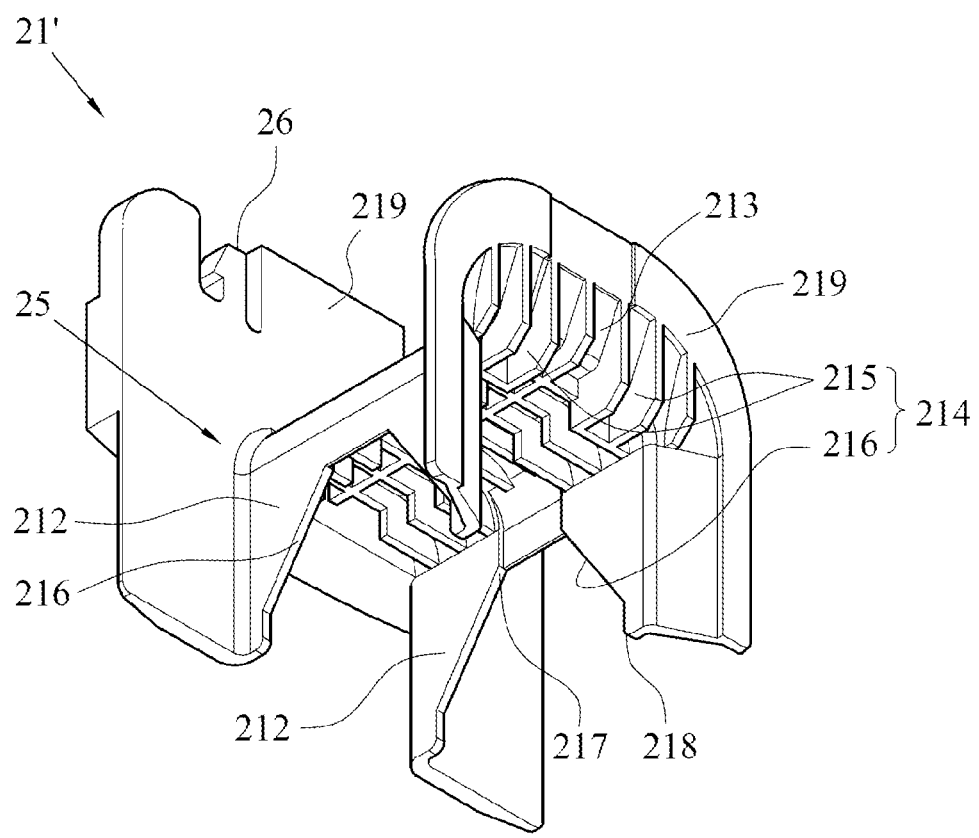
FIG. 8 is a three-dimensional view of an insulated wire frame according to another embodiment of a stator assembly of the instant disclosure.

Referring to FIG. 3, FIG. 4, and FIG. 5, the first U-shaped frame 21 includes a first filling port 213 and a first feed channel 214, and the first feed channel 214 is connected between the first filling port 213 and the two gaps G. In this embodiment, the first filling port 213 is arranged on one side of the first horizontal plate 211 (herein the first filling port 213 is arranged on the partition plate 219), and the first feed channel 214 includes a guide slot 215 and two hollow slots 216. The guide slot 215 disposed on the inner surface of the first horizontal plate 211 is connected to the first filling port 213, and the two hollow slots 216 separately arranged on the two first side plates 212 are separately connected between the guide slot 215 and the two gaps G. In another embodiment, as shown in FIG. 8, the first U-shaped frame 21' of the insulated wire frame 20 may also have a plurality of guide slots 215 to be separately connected to the two hollow slots 216, which is not limited in this embodiment. The structure of the second U-shaped frame 22 may be the same as or similar to that of the first U-shaped frame 21, and in this case, the second U-shaped frame 22 includes a second filling port 223 and a second feed channel 224, where the second feed channel 224 is connected between the second filling port 223 and the two gaps G.

Figure 7:
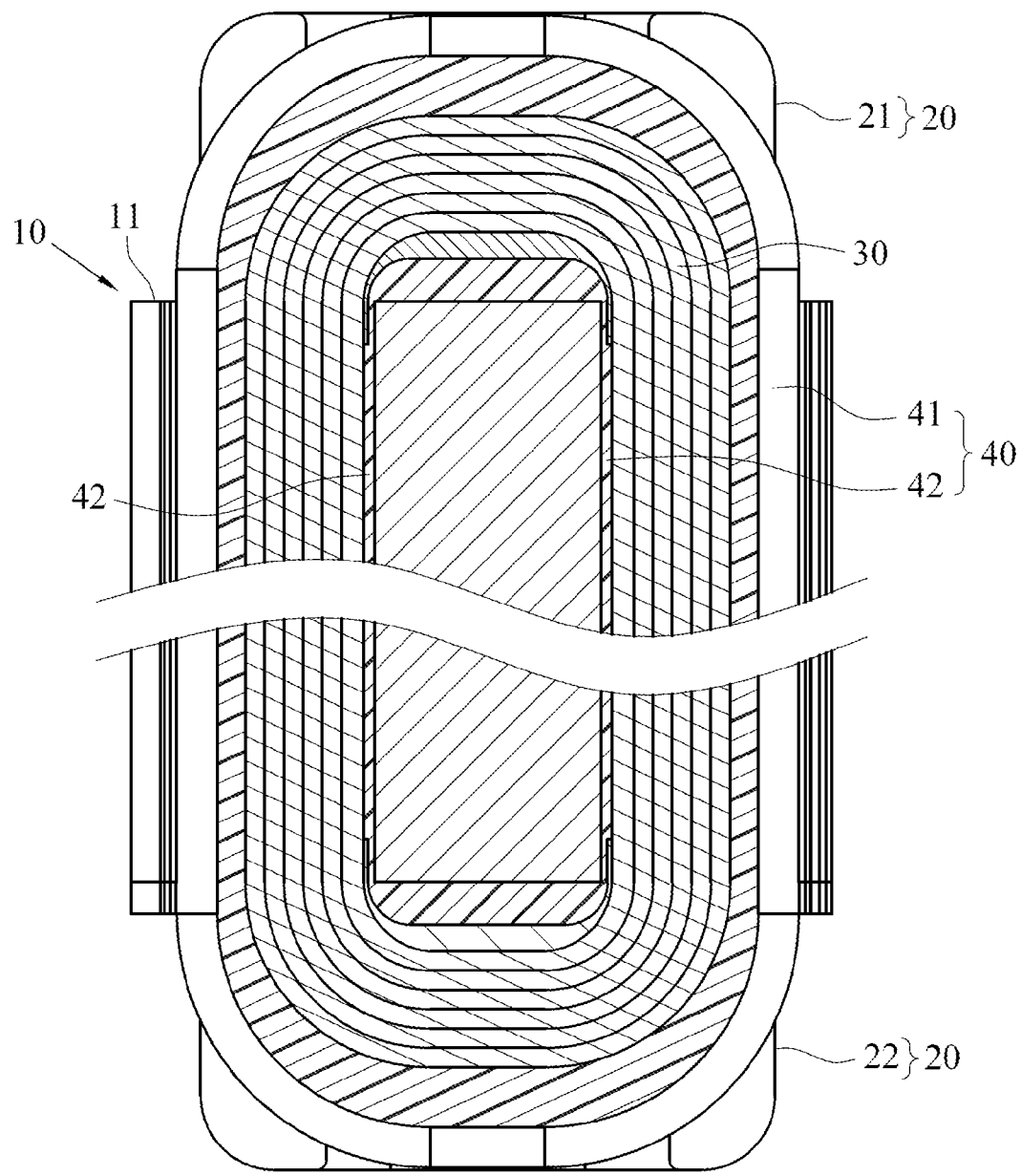
FIG. 7 is a cross-sectional view of a stator assembly according to an embodiment of the instant disclosure.

Referring to FIG. 5 and FIG. 6, in the injection moulding process of the annular insulation structure 40, after the coil 30 is wound, the stator assembly 2 can be disposed in a jig (not shown in the drawings), and the first filling port 213 and the second filling port 223 are exposed. Molten plastic (such as thermoplastic plastic or thermosetting plastic) are then injected by an injection moulding machine from the first filling port 213 of the first U-shaped frame 21 and the second filling port 223 of the second U-shaped frame 22 (as shown by an arrow L1 in FIG. 5). As shown in FIG. 6, the molten plastic can flow through the first feed channel 214 and the second feed channel 224 (as shown by an arrow L2 in FIG. 6) and gradually fill the two gaps G. In addition, the molten plastic may also flow out through a slit between the insulated wire frame 20, the stator core 10, and the coil 30, so that the molten plastic can further wrap the periphery of the coil 30. Next, as shown in FIG. 1 and FIG. 7, after a period of cooling time (about 1-2 minutes), the molten plastic cures to form a rigid annular insulation structure 40, and the manufacturing process of the stator assembly 2 is completed. For example, in this embodiment, the annular insulation structure 40 has an outer ring frame 41 wrapping the periphery of the coil 30 and inner filler pieces 42 filling the two gaps G. The outer ring frame 41 can insulate the coil 30 from the external mechanism of the stator assembly 2, and the inner filler pieces 42 can insulate the coil 30 from the internal radial tooth portion 15.

In summary, in the stator assembly 2 of the embodiment of the instant disclosure, the annular insulation structure 40 is formed by means of injection moulding to fill the two gaps G and wrap the periphery of coil 30, so that the coil 30 is quickly packaged between the insulated wire frame 20 and the annular insulation structure 40 to achieve insulation from the outside world, without further need to use insulating paper to wrap the two gaps G. Compared with the conventional manners of the potting process or the vacuum pressure impregnation treatment, the instant disclosure can greatly save time and cost. Specifically, the time of the injection moulding process (from injection of molten plastic to cooling to form the annular insulation structure 40) of the stator assembly 2 of the embodiment of the instant disclosure can be controlled to be about 2 minutes or less, while the potting process or the vacuum pressure impregnation treatment requires at least 2 hours.

Referring to FIG. 4 and FIG. 6, in an embodiment, each hollow slot 216 of the first U-shaped frame 21 may include a first port 217 connected to the guide slot 215 and a second port 218 connected to the two gaps G, and the second port 218 of each hollow slot 216 is larger than the first port 217. That is, each hollow slot 216 of the first U-shaped frame 21 gradually expands toward the gaps G to reduce the clogging of the molten plastic flowing to each hollow slot 216, and accelerate the flow rate of the molten plastic to further reduce the time of the injection moulding process. In an embodiment, the structure of the second U-shaped frame 22 may be the same as or similar to that of the first U-shaped frame 21, which is not further described herein.

Figure 9:
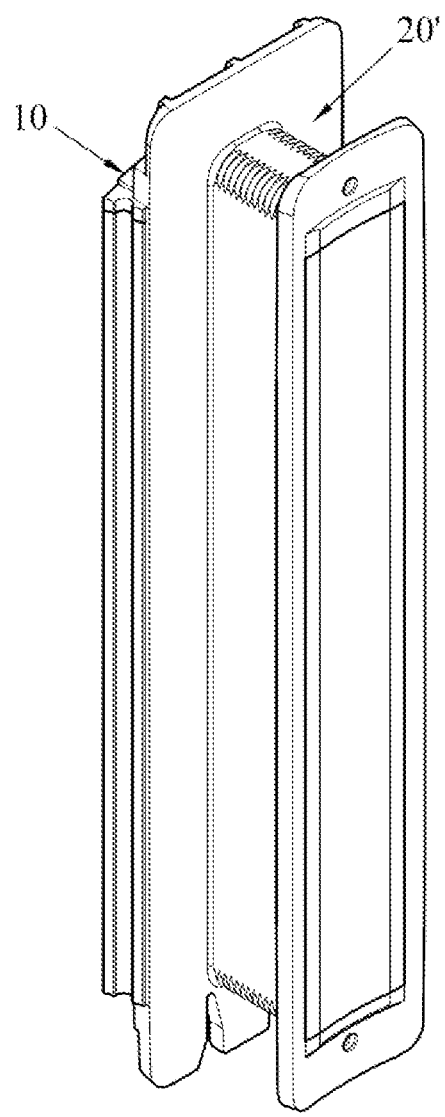
FIG. 9 is a three-dimensional view of an insulated wire frame according to still another embodiment of a stator assembly of the instant disclosure.

FIG. 9 is a three-dimensional view of an insulated wire frame according to another embodiment of a stator assembly of the instant disclosure. The difference between the insulated wire frame 20' of this embodiment and the insulated wire frame 20 of FIG. 3 is that the insulated wire frame 20' of this embodiment is formed by means of insert molding and surrounds the radial tooth portion 15 of the stator core 10, so that the process of assembling the insulated wire frame 20' is not needed. In addition, after the coil 30 is wound on the insulated wire frame 20' annularly, the molten plastic is injected from outside the coil 30 by the injection moulding machine to directly form the annular insulation structure 40 on the periphery of the coil 30 (that is, the annular insulation structure 40 only has the outer ring frame 41 to wrap the periphery of the coil 30), so that the process of opening the filling port and the feed channel in the insulated wire frame 20' is not needed.

Figure 10:
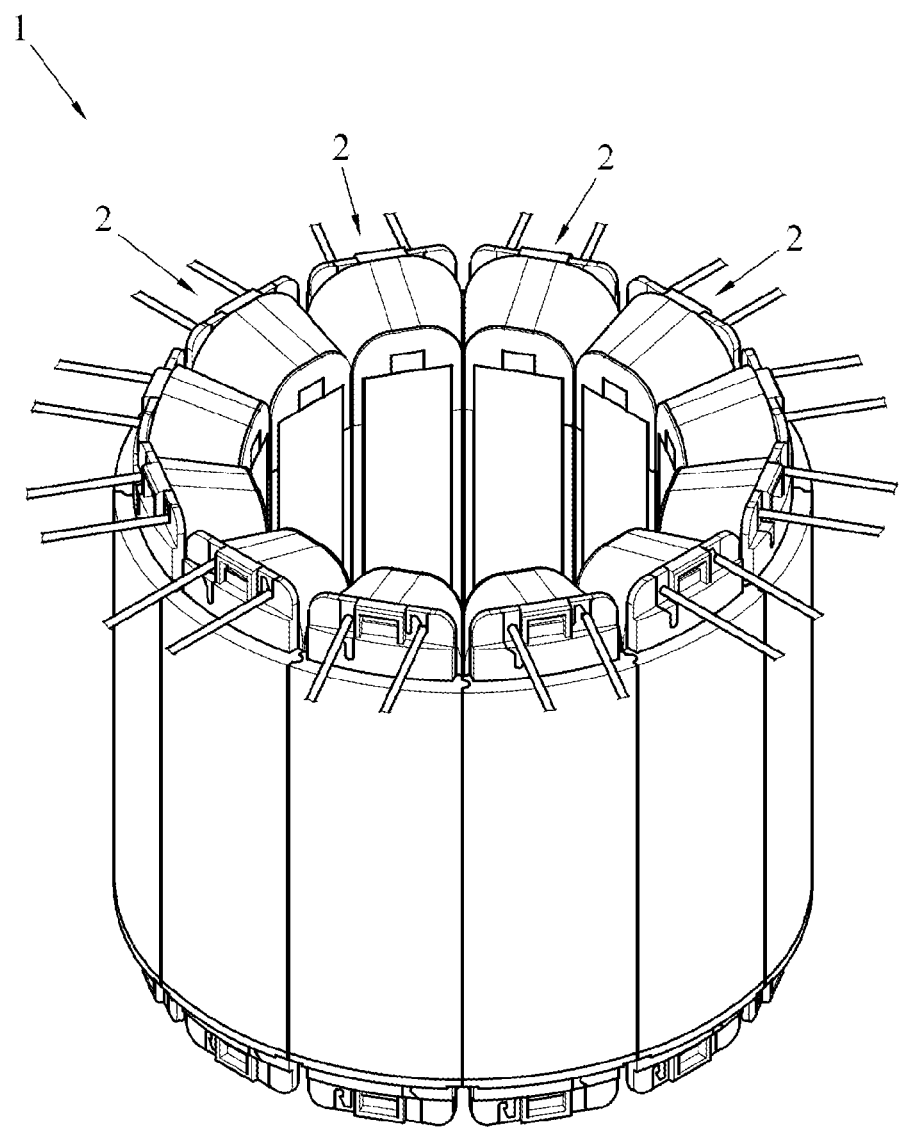
FIG. 10 is a three-dimensional view of a motor stator structure according to an embodiment of the instant disclosure.
Figure 11:
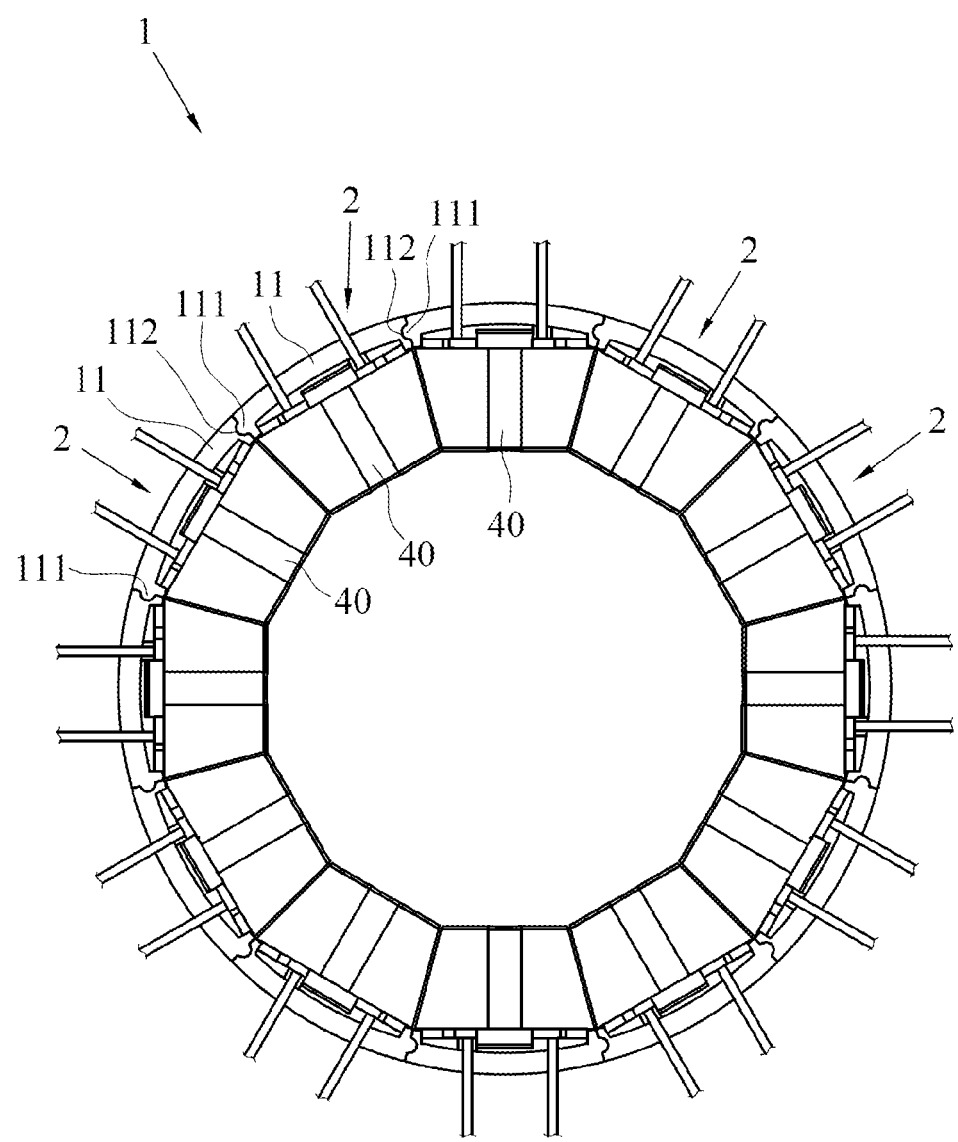
FIG. 11 is a top view of a motor stator structure according to an embodiment of the instant disclosure.

FIG. 10 and FIG. 11 are respectively a perspective view and a top view of an embodiment of a motor stator structure of the instant disclosure. The motor stator structure 1 can be formed by connecting a plurality of stator assemblies 2 of the above embodiments together in a circle arrangement. For example, in this embodiment, the motor stator structure 1 is formed by twelve stator assemblies 2. In each stator assembly 2, the insulation process of the coil 30 has been completed, that is, the periphery of the coil 30 of each stator assembly 2 is separately wrapped by the annular insulation structure 40. Therefore, after the plurality of stator assemblies 2 connected together in a circle arrangement forms the motor stator structure 1, the motor stator structure 1 can be directly assembled in the motor outer frame, and the insulation process between the motor outer frame and the motor stator structure 1 (such as the potting process or the vacuum pressure impregnation treatment) is not needed, thereby simplifying the motor manufacturing process and increasing the production yield.

As shown in FIG. 10 and FIG. 11, the magnetic yoke portion 11 of the stator core 10 of each stator assembly 2 may have a first joint section 111 and a second joint section 112 opposite to each other, where the first joint section 111 and the adjacent second joint section 112 of two adjacent stator assemblies 2 are joined together to form the motor stator structure 1. As shown in FIG. 11, in this embodiment, the first joint section 111 of each stator assembly 2 is a bump at one end of the magnetic yoke portion 11, and the second joint section 112 is a groove at the other end of the magnetic yoke portion 11. The opposite first joint section 111 and second joint section 112 of two adjacent stator assemblies 2 can be closely fitted and engaged to each other to form a ring structure (for example, the first joint section 111 can be forcibly pressed into the second joint section 112 to form a tightly fit and engagement). In this way, external jigs or frames are not needed to prevent detachment of the stator assemblies 2, thereby further reducing the cost. In other embodiments, the joint and positioning can also be achieved by welding or bonding between the stator assemblies 2, which is not limited in this embodiment.

In summary, in the stator assembly according to the embodiments of the instant disclosure, the annular insulation structure is formed by means of injection moulding and wraps the coil, so that the coil is quickly packaged between the insulated wire frame and the annular insulation structure to achieve insulation from the outside world. Compared with the conventional manners of the potting process or the vacuum pressure impregnation treatment, the instant disclosure can greatly save time and cost. In addition, because the coil insulation process is completed on each stator assembly, the motor stator structure can be formed by connecting the stator assemblies into an annular structure, and the motor stator structure can be directly assembled in the motor outer frame without any further insulation process, thereby simplifying the motor manufacturing process and increasing the production yield.

Although the instant disclosure has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A stator assembly, comprising:
   a stator core, comprising a magnetic yoke portion and a radial tooth portion, wherein the radial tooth portion extends from the magnetic yoke portion, the radial tooth portion comprises a first end and a second end in an axial direction; and
   an insulated wire frame, disposed outside the radial tooth portion of the stator core, and having a winding slot, the insulated wire frame comprises a first U-shaped frame sleeved on the first end of the radial tooth portion;
   a coil, wound in the winding slot of the insulated wire frame annularly; and
   an annular insulation structure, formed by means of injection moulding, and wrapping an area where the coil is exposed out of the insulated wire frame, so that the coil is packaged between the insulated wire frame and the annular insulation structure;
   wherein two gaps are formed between the first U-shaped frame, the coil, and the radial tooth portion, the first U-shaped frame comprises a first filling port and a first feed channel, and the first feed channel is connected between the first filling port and the two gaps.

2. The stator assembly according to claim 1, wherein the insulated wire frame is formed by means of insert molding and surrounds the radial tooth portion, and the annular insulation structure wraps the coil.

3. The stator assembly according to claim 1, wherein the insulated wire frame further comprises a second U-shaped frame sleeved on the second end of the radial tooth portion.

4. The stator assembly according to claim 3, wherein the two gaps are formed between the first U-shaped frame, the second U-shaped frame, the coil, and the radial tooth portion; the annular insulation structure comprises an outer ring frame wrapping the coil and two inner filler pieces separately accommodated in the two gaps.

5. The stator assembly according to claim 4, wherein the radial tooth portion comprises two opposite sidewalls, and the first U-shaped frame comprises a first horizontal plate and two first side plates connected to two sides of the first horizontal plate; the first horizontal plate abuts against the first end of the radial tooth portion, and the two first side plates abut against the two sidewalls; the first filling port is arranged on a side of the first horizontal plate; and the first feed channel comprises at least one guide slot and two hollow slots, wherein the at least one guide slot is disposed on an inner surface of the first horizontal plate and is connected to the first filling port, and the two hollow slots are separately arranged on the two first side plates and are separately connected between the at least one guide slot and the two gaps.

6. The stator assembly according to claim 5, wherein each hollow slot comprises a first port connected to the at least one guide slot and a second port connected to one of the two gaps, and the second port is larger than the first port.

7. The stator assembly according to claim 4, wherein the injection moulding forms the annular insulation structure by injecting plastic through the first filling port.

8. The stator assembly according to claim 4, wherein the second U-shaped frame comprises a second filling port and a second feed channel, and the second feed channel is connected between the second filling port and the two gaps.

9. The stator assembly according to claim 1, wherein the insulated wire frame further comprises a winding fixing portion.

10. A motor stator structure, comprising:
    a plurality of stator assemblies according to claim 1, wherein the stator assemblies are connected together in a circle arrangement to form an annular structure.

11. The motor stator structure according to claim 10, wherein the magnetic yoke portion of the stator core of each stator assembly comprises a first joint section and a second joint section opposite to each other, wherein the first joint section and the adjacent second joint section of two adjacent stator assemblies are joined together.

12. The motor stator structure according to claim 10, wherein the insulated wire frame is formed by means of insert molding and surrounds the radial tooth portion, and the annular insulation structure wraps the coil.

13. The motor stator structure according to claim 10, wherein insulated wire frame further comprises a second U-shaped frame sleeved on the second end of the radial tooth portion.

14. The motor stator structure according to claim 13, wherein the two gaps are formed between the first U-shaped frame, the second U-shaped frame, the coil, and the radial tooth portion; the annular insulation structure comprises an outer ring frame wrapping the coil and two inner filler pieces separately accommodated in the two gaps.

15. The motor stator structure according to claim 14, wherein the radial tooth portion comprises two opposite sidewalls, and the first U-shaped frame comprises a first horizontal plate and two first side plates separately connected to two sides of the first horizontal plate; the first horizontal plate abuts against the first end of the radial tooth portion, and the two first side plates abut against the two sidewalls; the first filling port is arranged on a side of the first horizontal plate; and the first feed channel comprises at least one guide slot and two hollow slots, wherein the at least one guide slot is disposed on an inner surface of the first horizontal plate and is connected to the first filling port, and the two hollow slots are separately arranged on the two first side plates and are separately connected between the at least one guide slot and the two gaps.

16. The motor stator structure according to claim 15, wherein each hollow slot comprises a first port connected to the at least one guide slot and a second port connected to one of the two gaps, and the second port is larger than the first port.

17. The motor stator structure according to claim 14, wherein the injection moulding forms the annular insulation structure by injecting plastic through the first filling port.

18. The motor stator structure according to claim 14, wherein the second U-shaped frame comprises a second filling port and a second feed channel, and the second feed channel is connected between the second filling port and the two gaps.

* * * * *